United States Patent [19]

Mochizuki

[11] Patent Number: 5,056,764
[45] Date of Patent: Oct. 15, 1991

[54] SHOCK ABSORBER FOR USE IN TOYS

[75] Inventor: Takashi Mochizuki, Shimizu, Japan

[73] Assignee: Kabushiki Kaisha Tamiya Mokei, Shizuoka, Japan

[21] Appl. No.: 586,378

[22] Filed: Sep. 21, 1990

Related U.S. Application Data

[63] Continuation of Ser. No. 310,435, Feb. 15, 1989, abandoned.

[30] Foreign Application Priority Data

Feb. 22, 1988 [JP] Japan ................................ 63-22112

[51] Int. Cl.$^5$ .............................................. F16F 1/12
[52] U.S. Cl. ................................ 267/291; 188/321.11; 267/169; 403/324; 403/328; 403/354
[58] Field of Search .................... 188/321.11; 267/169, 267/291; 403/354, 324, 328, 108; 74/502.6, 502.4

[56] References Cited

U.S. PATENT DOCUMENTS

| | | | |
|---|---|---|---|
| 1,503,932 | 8/1924 | Wilhelm et al. | 403/328 X |
| 2,924,116 | 2/1960 | Abbott | 74/502.4 X |
| 3,292,203 | 12/1966 | Spencer | 74/502.4 X |
| 3,995,512 | 12/1976 | Johnsen | 74/502.4 |
| 4,245,826 | 1/1981 | Wirges | 188/321.11 X |
| 4,307,623 | 12/1981 | Cavallero et al. | 188/321.11 X |
| 4,389,135 | 6/1983 | Peters | 403/379 X |
| 4,518,002 | 5/1985 | Battiston et al. | 403/328 X |
| 4,760,871 | 8/1988 | Vijay | 403/324 X |

Primary Examiner—George E. A. Halvosa
Attorney, Agent, or Firm—Finnegan, Henderson, Farabow, Garrett & Dunner

[57] ABSTRACT

A shock absorber for use in toys comprising a rod for supporting a wheel, a retainer slidably along the rod, and a spring interposed between the lower section of the rod and the retainer which forces the retainer upwardly. These members can be pre-assembled as unit kit. When the shock absorber is mounted on a chassis member, the retainer is depressed downwardly against the biasing force of the spring and the rod is inserted into a bore formed on a chassis member through a opening side groove thereon. After that, the retainer is held in a recess on the bottom of the chassis member so that the rod is reciprocable along the retainer and the bore of the chassis member to absorb the vibration or shock from the wheel.

2 Claims, 3 Drawing Sheets

SHOCK ABSORBER FOR USE IN TOYS

This application is a continuation of application Ser. No. 07/310,435, filed Feb. 15, 1989, now abandoned.

BACKGROUND OF THE INVENTION

1. Field of the Invention

The present invention relates to a shock absorber for use in toys which may be easily attached to the chassis member of toys.

2. Description of the Prior Art

A shock absorber for use in a toy is normally constructed in such a way that an eye member and a stud member are provided at the opposite ends thereof and a spring or a vibration absorbing body using oil is interposed between the eye member and the stud member. It is therefore necessary that two steps be executed for assembling this kind of shock absorber, namely, attachment of the eye member to a member supporting a wheel in addition to attachment of the stud to a chassis.

In the case of attaching a shock absorber to a toy car, the two kinds of attachment steps are not desirable due to increasing the man-power involved in the work in an assembly line. Accordingly, such a shock absorber as shown in FIG. 4 is employed for a recent toy car. More specifically, according to this construction of a shock absorber 1, a rod 5 having a head 4 is slidably inserted in a bore 3 drilled through the chassis 2, and the lower portion of the rod 5 is screwed into any eye portion 7 is such a manner that one end of a spring 6 is in abutment against the chassis 2 and the other end of the spring 6 is seated against the eye portion 7 adapted to support a wheel or the like.

As explained above since the shock absorber 1 will be completed only after the rod 5, the spring 6 and the eye portion 7 are assembled in series to the chassis 2 and those components constituting the shock absorber are finally attached to the chassis 2. Thus the number of assembly steps in the final assembly line will be inevitably increased and any reduction in man-hours of work will not be attainable. Furthermore, managerial control of the parts will also be complicated.

When this kind of shock absorber is to be contained in an assembly kit, every part has to be stored individually. This may cause inconvenience to the user for reassembly as well as problems that some parts may get lost and so forth.

Accordingly the present invention is proposed to solve the problems as above mentioned and satisfy the requirements expected for a shock absorber.

SUMMARY OF THE INVENTION

In order to solve the problems as above explained, the present invention provides a shock absorber for use in toys including a rod having at its lower section a portion adapted to support a wheel, a retainer slidable along the rod, and a spring elastically biased between the retainer and the lower portion of the rod, characterized in that a bore adapted to receive the rod and a recessed portion adapted to receive the retainer are provided on a chassis member and are opened by a groove extending toward the side of the chassis member and the rod is inserted into the bore and a part of the retainer is inserted in the recessed portion respectively through the groove when the shock absorber is mounted on the chassis member.

According to the shock absorber of the present invention, the retainer is depressed along the rod against the biasing force of the spring and under this condition the rod is pushed into the bore via the groove. Then the retainer is put into the recessed portion. Since the diameter of the retainer is somewhat larger than the width of the groove, the retainer will not come off the groove but is held in the recessed portion. In other words, the shock absorber may be handled as a pre-assembled unit and this makes management of the parts much easier easier. Furthermore, since the shock absorber may be attached to the chassis in the final assembly line simply by depressing the retainer and inserting the rod into the bore, the man-hours required for its attachment will not be increased. Also, an assembly kit of the parts may be easily assembled and there is no fear of parts being missed.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
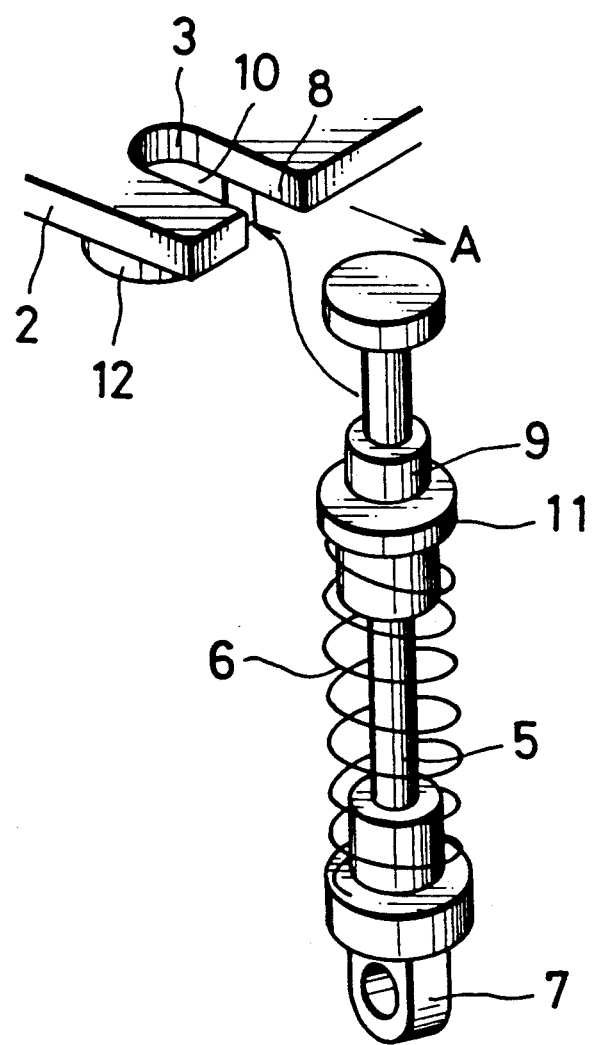
FIG. 1 is the perspective view showing an embodiment of the present invention.
Figure 2:
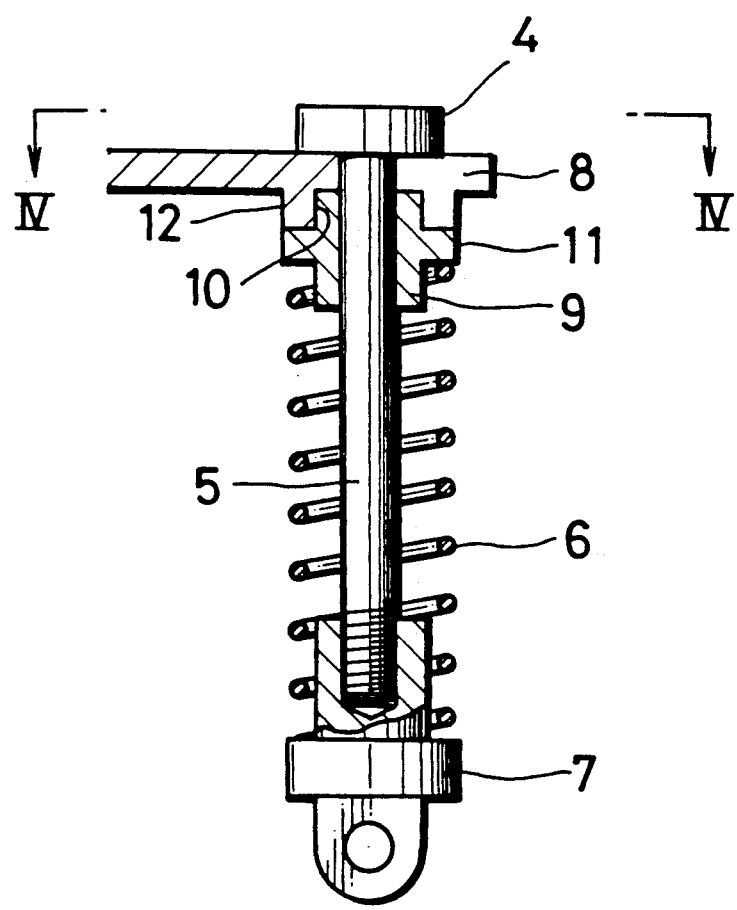
FIG. 2 is the side elevation partly shown in section of the present invention in an assembled condition.
Figure 3:
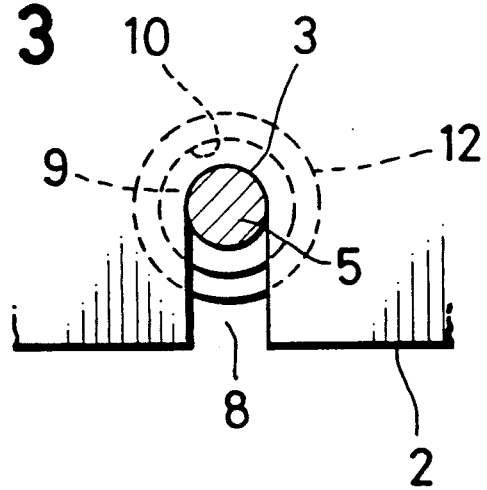
FIG. 3 is the sectional view taken along the lines IV—IV indicated by the arrow in FIG. 2.
Figure 4:
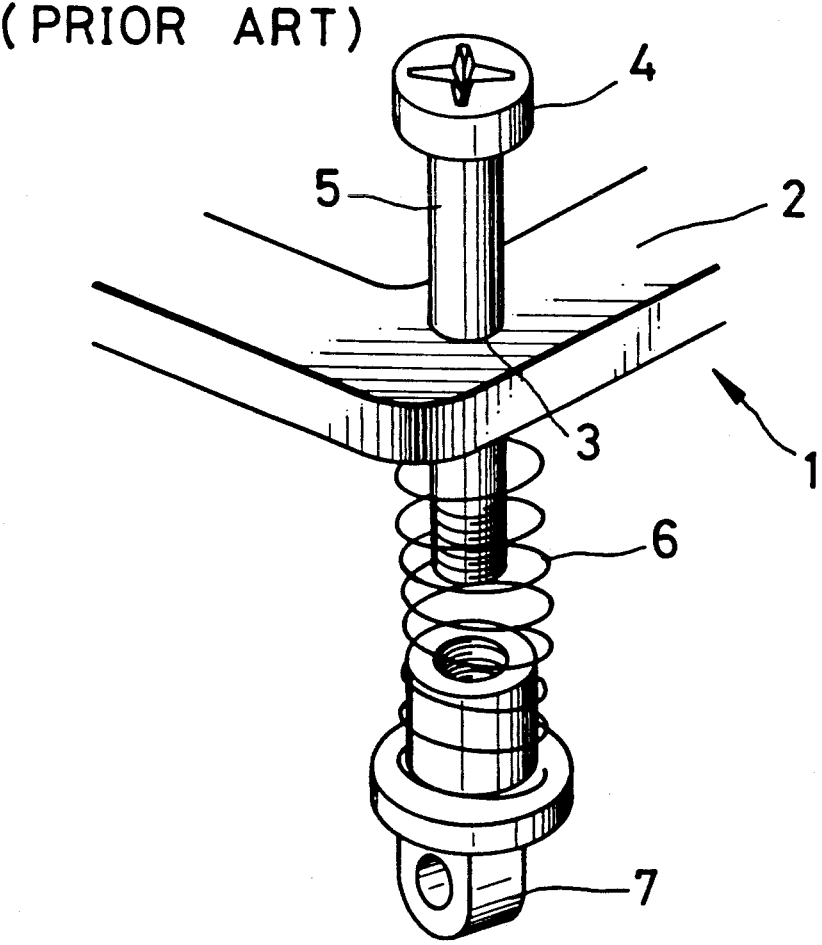
FIG. 4 is the perspective view showing an embodiment of the prior art.

Reference is now made to FIG. 1 through FIG. 3. A slatted bore 3 in the chassis 2 opens outwardly via a groove 8 which extends side ways of the chassis. The width of the groove 8 is made slightly larger than the diameter of the rod 5, which is made of metal, and has a head 4 so that the rod 5 can be inserted into the bore 3. A retainer 9 formed of a synthetic resin is slidably mounted on to the rod 5 and one end of the spring 6 lies in abutment against a flange 11 on the retainer 9. The other end of said spring 6 is carried by the eye member 7 also formed of a synthetic resin and screwed or pressed fit onto the lower end of the rod 5, so that the biasing force of the spring 6 forcibly pushes the retainer 9 upwardly along the rod 5.

On the lower surface of the chassis 2, there is provided means defining a recess 10. As embodied, this recess is formed by a depending curved wall member 12. The internal diameter of the recess 10 is large enough to slidably receive the upper portion of retainer 9 above flange 11, which portion of the retainer has an outer circumferential surface larger than that of the rod 5. The recess 10 opens outwardly in the same direction as groove 8 and the annular flange 11 on retainer 9 abuts against the lower surface of the wall member 12 defining said means 10 under the force the spring.

In assembly, the retainer 9 is depressed downwardly against the biasing force of the spring 6 and the rod 5 inserted in the bore 3 through the groove 8. This also places rod 5 in recess 10 after which retainer 9 is released so that its upper portion will seat in recess portion 10 permitting the rod 5 to be movable relative to the chassis 2. Namely, the rod 5 will be able to reciprocate through the central bore of the retainer 9 and the bore 3 of the chassis 2.

If the outer circumferential surface of the retainer 9 is tapered while the inner circumferential surface of the recess 10 is correspondingly tapered, then the recess 10 may be easily aligned with the rod 5 in respect of their centers.

According to the present invention, the shock absorber includes eye member 7 and thus is constituted so that it may be pre-assembled, whereby managerial control of its parts as well as assembly of the absorber to a chassis may be made easier. Furthermore, since use of the retainer makes the sliding and guiding surface of the rod larger, the rod can be moved more smoothly.

As many apparently widely different embodiments of the present invention can be made without departing from the spirit and scope thereof, it is to be understood that the invention is not limited to the specific embodiments thereof expect as defined in the appended claim.

What is claimed

1. A shock absorber for use with a toy vehicle having a chassis, comprising a rod having a head at one end and a mounting member on the other end thereof, a retainer slidable along said rod between the head and said member, said retainer having a flange portion and an upper head portion smaller than said flange portion on the side of the retainer adjacent said head of the rod, a spring circling said rod and biased between the flange of said retainer and said member, a slotted bore in said chassis smaller in size than the head of the rod and said upper head portion of the retainer for slidably receiving said rod that communicates with an edge of the chassis to permit the rod to be inserted into said bore in a direction transverse to its length, and recess means mounted on the chassis co-axially with and on the lower side of the bore, said recess means having a first opening extending in the same direction as said slotted bore for receiving said rod but not large enough to permit said upper head portion of the retainer to pass through and having a second opening extending downwardly from the lower side of the bore for receiving the upper head portion of the retainer, the force of the spring holding the retainer in the recess means and thereby holding the shock absorber in place on the chassis of the vehicle when the rod is inserted into the bore with the head of the rod being located on the upper side of the bore.

2. The shock absorber of claim 1, wherein said upper head portion of the retainer is circular and of greater diameter than said bore and the recess means comprises a curved wall depending from the lower side of said bore, said wall having an opening extending in the direction of the slotted bore and forming a recess for receiving the upper head portion of the retainer with the flange of the retainer resting against the bottom surface of the curved wall.

* * * * *